US008654721B2

(12) United States Patent
Mueck

(10) Patent No.: US 8,654,721 B2
(45) Date of Patent: Feb. 18, 2014

(54) COMMUNICATION DEVICES, METHOD FOR DATA COMMUNICATION, AND COMPUTER PROGRAM PRODUCT

(75) Inventor: Markus Dominik Mueck, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 325 days.

(21) Appl. No.: 12/849,846

(22) Filed: Aug. 4, 2010

(65) Prior Publication Data
US 2012/0033621 A1 Feb. 9, 2012

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| 2001/0036810 | A1 | 11/2001 | Larsen | |
|---|---|---|---|---|
| 2002/0104011 | A1 | 8/2002 | Svoboda et al. | |
| 2005/0128995 | A1 | 6/2005 | Ott et al. | |
| 2008/0192820 | A1 | 8/2008 | Brooks et al. | |
| 2011/0090878 | A1* | 4/2011 | Seibert et al. | 370/338 |

FOREIGN PATENT DOCUMENTS

| EP | 1722512 A1 | 11/2006 |
|---|---|---|
| WO | 2004095167 A2 | 11/2004 |
| WO | 2005062504 A1 | 7/2005 |
| WO | 2006113872 A1 | 10/2006 |
| WO | 2006138581 A2 | 12/2006 |
| WO | 2007045779 A1 | 4/2007 |
| WO | 2008119948 A1 | 10/2008 |
| WO | 2009005971 A1 | 1/2009 |
| WO | 2009085266 A2 | 7/2009 |
| WO | 2010027308 A1 | 3/2010 |
| WO | 2010057086 A2 | 5/2010 |
| WO | 2010084801 A1 | 7/2010 |

OTHER PUBLICATIONS

NPL (Artur Pereira, Atilio Gameiro, IEEE, 2007), opportunistic Radio and Licensed Users Coexistence in Cellular Networks, p. 537-542, 2007 IEEE.*
Pereira et al., Opportunistic Radio and Licensed User Coexistence in Cellular Networks, 2007 IEEE, ISWPC '07. 2nd International Symposium, Feb. 5-7, 2007, pp. 1-6.
Leem et al., "Spectral Efficiency of WRAN Spectrum Overlay in the TV White Space", ETRI Journal, vol. 30, Nr. 6, Dec. 2008, pp. 871-873.
Shellhammer et al., "Coexistence Tutorial Material", sg-whitespace-09/0040r0, Feb. 23, 2009, pp. 1-16.
Wang et al., "Exploring Opportunistic Spectrum Availability in Wireless Communication Networks", Jul. 14, 2008, pp. 61-86.
M. Mueck, "IEEE SCC41 Ad Hoc on WS Radio White Space Usage Models", doc.: scc4l-ws-radio-10/8r0, May 1, 2010, pp. 1-7.

(Continued)

Primary Examiner — Chi Pham
Assistant Examiner — Kouroush Mohebbi

(57) ABSTRACT

A communication device is described comprising a transceiver, a determining circuit configured to determine whether the communication device may use radio resources, which are allocated to be used by a wireless bidirectional communication system in the geographical region in which the communication device is located, for radio data communication without participation by the wireless bidirectional communication system, and a controller configured to control the transceiver to carry out radio data communication using the radio resources if the communication device may use the radio resources.

22 Claims, 13 Drawing Sheets

(56) References Cited

OTHER PUBLICATIONS

Technical and operational information for identifying Spectrum for the terrestrial component of future development of IMT-2000 and IMT-Advanced, Report ITU-R M.2079, 2006, http://www.itu.int/pub/R-REP-M.2079-2006/en, pp. 1-48.

IEEE 802.11y-2008, from Wikipedia, (Redirected from 802.11y), http://en.wikipedia.org/wiki/802.11y, pp. 1-8.

Ofcom, 3G Coverage maps, Publication date: 8 Jul. 8, 2009, http://www.ofcom.org.uk/radiocomms/ifi/licensing/classes/broadband/cellular/3g/maps/3gmaps/coverage_maps.pdf, pp. 1-10.

"World Radiocommunication Conference (WRC-07)", Geneva, Oct. 22-Nov. 16, 2007, Proposal for the work of the Conference, pp. 1-3.

Cognitive Radio Technologies Proceeding (CRTP), http://www.fcc.gov/oet/cognitiveradio/, pp. 1-3.

IEEE 802.22, Working Group, http://www.iee802.org/22/, pp. 1.

IEEE 802.11 Wireless Local Area Networks, http://www.ieee802.irg/11/, pp. 1-2.

IEEE SCC41—IEEE P 1900.4a, http://grouper.ieee.org//groups/scc41/4/index.htm/, pp. 1.

IEEE 802.19 Wireless Coexistence Working Group (WG), http://www.ieee802.org/19/, pp. 1-2.

* cited by examiner

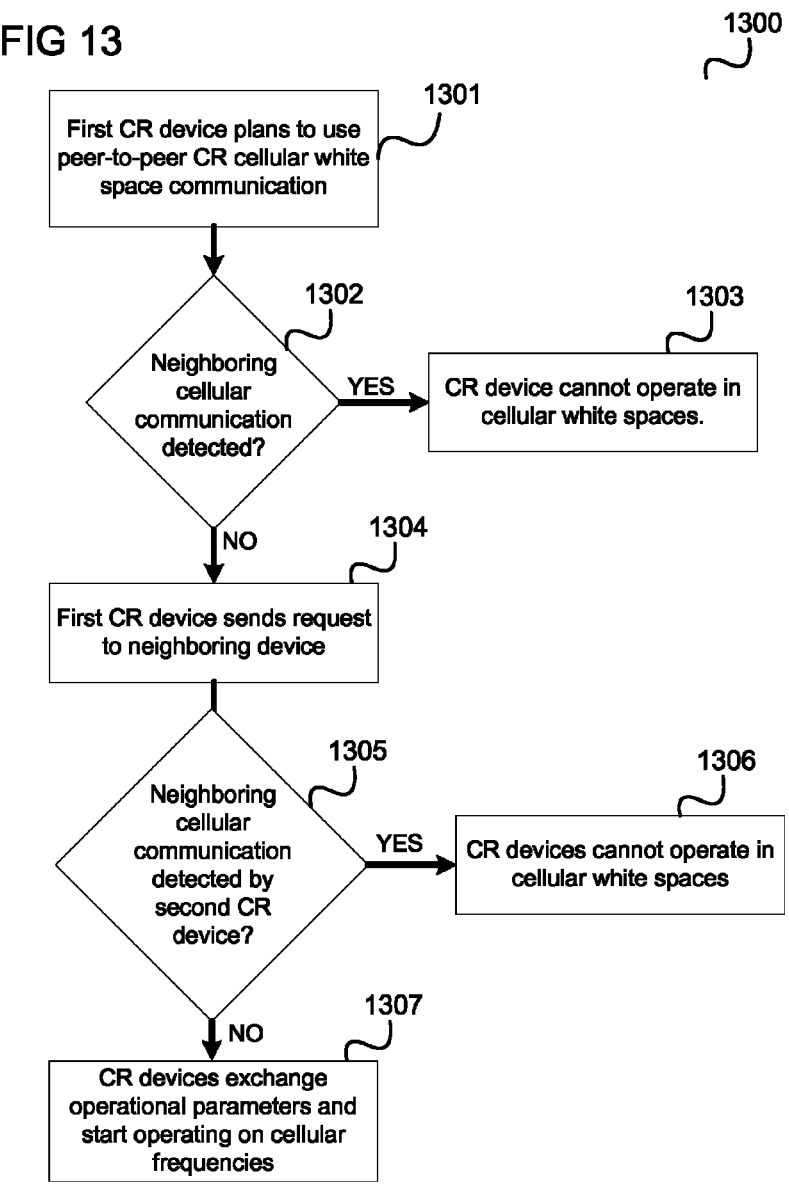

COMMUNICATION DEVICES, METHOD FOR DATA COMMUNICATION, AND COMPUTER PROGRAM PRODUCT

TECHNICAL FIELD

Embodiments generally relate to communication devices, a method for data communication, and a computer program product.

BACKGROUND

With an increasing amount of data being transmitted by radio, radio resources, such as frequency bands or frequency regions, have become a scarce resource. Therefore, it is desirable to have an efficient use of radio resources.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 13 shows a flow diagram according to an embodiment.

DESCRIPTION

Figure 1:
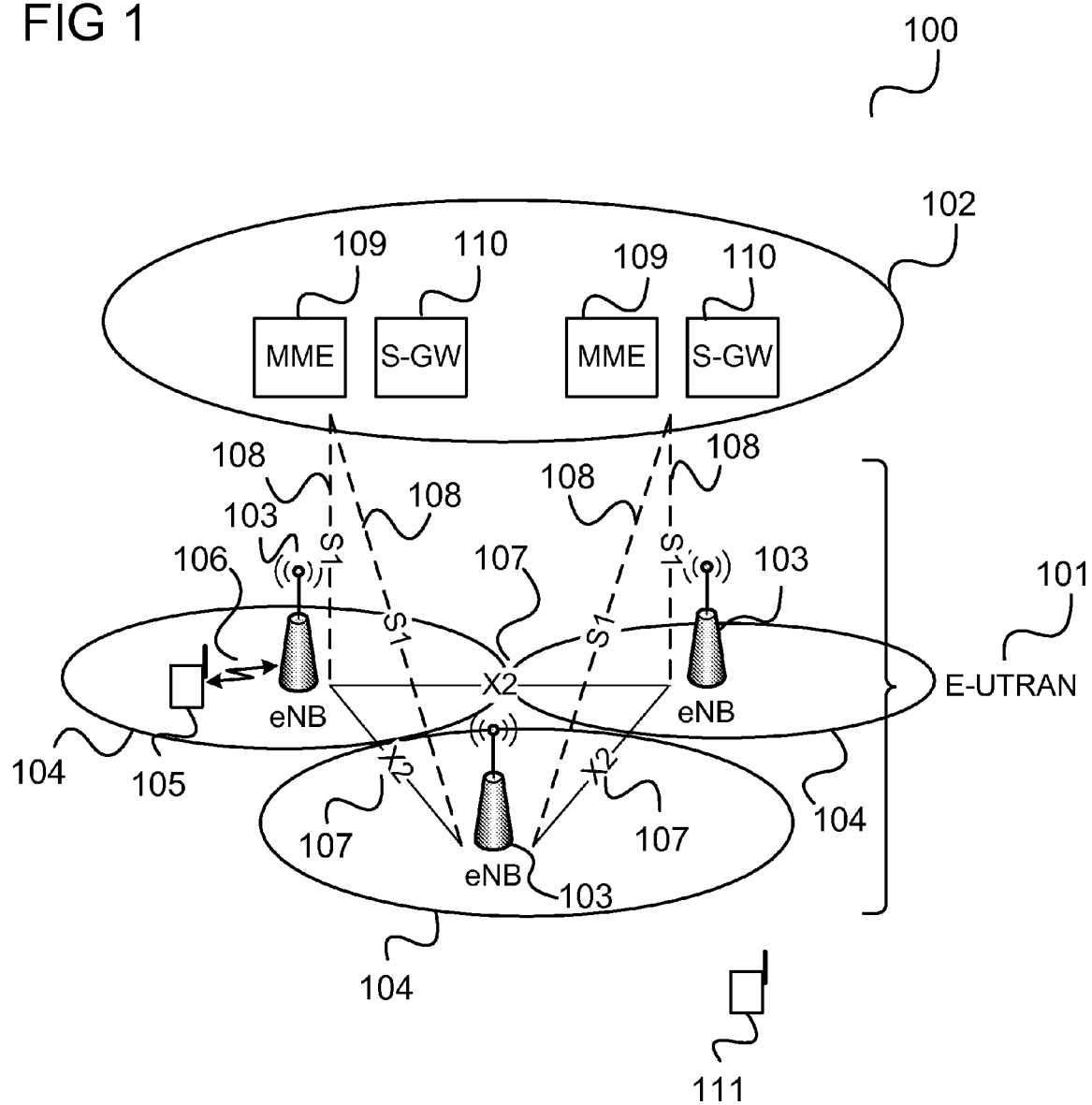
FIG. 1 shows a communication system according to an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Today, the term "white spaces" is typically used in the context of the switching from analogue to digital TV (television). Since digital TV needs far less bandwidth due its increased spectral efficiency over the legacy analogue TV, large parts of the frequency band that is currently occupied by analogue TV can be reused by other systems. For this purpose, two approaches may be used:

Some parts of the spectrum may be entirely re-assigned to other systems. For example, the spectrum 790-862 MHz (in Europe) or 698-790 MHz (in the US) is typically auctioned by national regulators. This part of the spectrum is referred to by "Digital Dividend".

Some parts of the spectrum may be assigned to the newly introduced digital TV. Typically, this is the spectrum 470-790 MHz in Europe and between 54-698 MHz in the US (TV channels 2-51; however not all the spectrum between 54-698 MHz is available, there are some parts allocated to other systems, white spaces are only possible to used for those parts that are actually allocated to TV). It can be expected, however, that the digital TV coverage may be low in some geographical regions. Therefore, "secondary" systems, i.e. other communication systems than the TV broadcasting network, may be allowed to access these frequency bands if the "primary" system, i.e. the TV broadcaster, is not using it. These (temporally, geographically) unused parts of the spectrum are referred to by "white spaces".

The idea of introducing "white spaces" for allowing unlicensed users to operate in licensed bands may be applied to other frequency bands than frequency bands allocated to TV broadcast. For example, according to the IEEE 802.11y standard, similar ideas may be applied to satellite bands.

The usage of white spaces is discussed in various standardization bodies and fora with the specific focus on TV white spaces.

In one embodiment, means are proposed for using "white spaces" in cellular phone frequency bands, i.e. in frequency bands allocated to one or more cellular mobile communication systems, or, generally in frequency bands allocated to wireless bidirectional communication systems. This may provide a high amount of communication resources, since the geographic coverage of cellular phone access, i.e. of cellular mobile radio networks, such as UMTS communication networks, is still limited to key areas in the various countries. For example, an analysis of the UMTS coverage in the UK in 2008 for a part of the spectrum licensed by one operator has shown that this part of the spectrum is unused in vast parts of the country. As long as the operator is not using this part of the spectrum, i.e. these frequency regions, in these geographical regions this part of the spectrum may be opened to other systems, e.g. for secondary spectrum usage, i.e. for usage of this part of the spectrum by other communication systems than the cellular communication network of this operator.

In the framework of IMT-Advanced, further frequency bands will most likely be made available, between 400 MHz to 5 GHz. This may for example be the following frequency bands:

410-430 MHz,
450-470 MHz,
470-960 MHz,
1 710-2 025 MHz and 2 110-2 200 MHz,
2 300-2 400 MHz,
2 500-2 690 MHz,
2 700-2 900 MHz,
3 400-4 200 MHz,
4 400-4 990 MHz.

It can be expected that many of those frequency bands will remain unused—at least during the early phases of the IMT-Advanced deployment. And even after this initial phase, it can be expected that a high level of usage for all of these frequency bands will only occur in some high-density populated areas while the spectrum will be available in other geographical regions. Such bands may therefore be opened to other systems, e.g. for secondary spectrum usage.

In one embodiment, means are provided for enabling an efficient introduction of secondary spectrum usage devices to frequency bands used by directional communication systems, e.g. cellular frequency bands, i.e. frequency bands allocated to a wireless bidirectional communication system such as a cellular mobile communication system.

This is explained in the following with reference to an LTE (Long Term Evolution) cellular communication system as example for a wireless bidirectional communication system.

FIG. 1 shows a communication system 100 according to an embodiment.

According to this embodiment, the communication system 100 is configured in accordance with the network architecture of LTE.

The communication system includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile terminal (UE, user equipment) 105 located in a mobile radio cell 104 may communicate with the core network 102 and with other mobile terminals 105 via the base station providing coverage (in other words operating) the mobile radio cell.

Control and user data are transmitted between a base station 103 and a mobile terminal located in the mobile radio cell 104 operated by the base station 103 over the air interface 106 on the basis of a multiple access method.

The base stations 103 are interconnected with each other by means of the X2 interface 107. The base stations are also connected by means of the S1 interface 108 to the core network (Evolved Packet Core) 102, more specifically to a MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

The radio cells 104 operated by the base stations 103 typically cover only certain geographical regions while other regions may not be covered by a radio cell 104. For example, in a certain geographical region, e.g. in an area with little population the operator of the communication system 100 may not have implemented a base station providing network coverage. Accordingly, a communication device 111 may be located outside of the coverage are of the communication system 100. In other words, the communication device 111 is not located in a radio cell 104 of the communication system 100 and is thus located in an area where the radio resources that are allocated to the communication system, e.g. for which the operator of the communication system has the right of usage (e.g. due to corresponding licensing), are not being used by the communication system 100.

Figure 2:
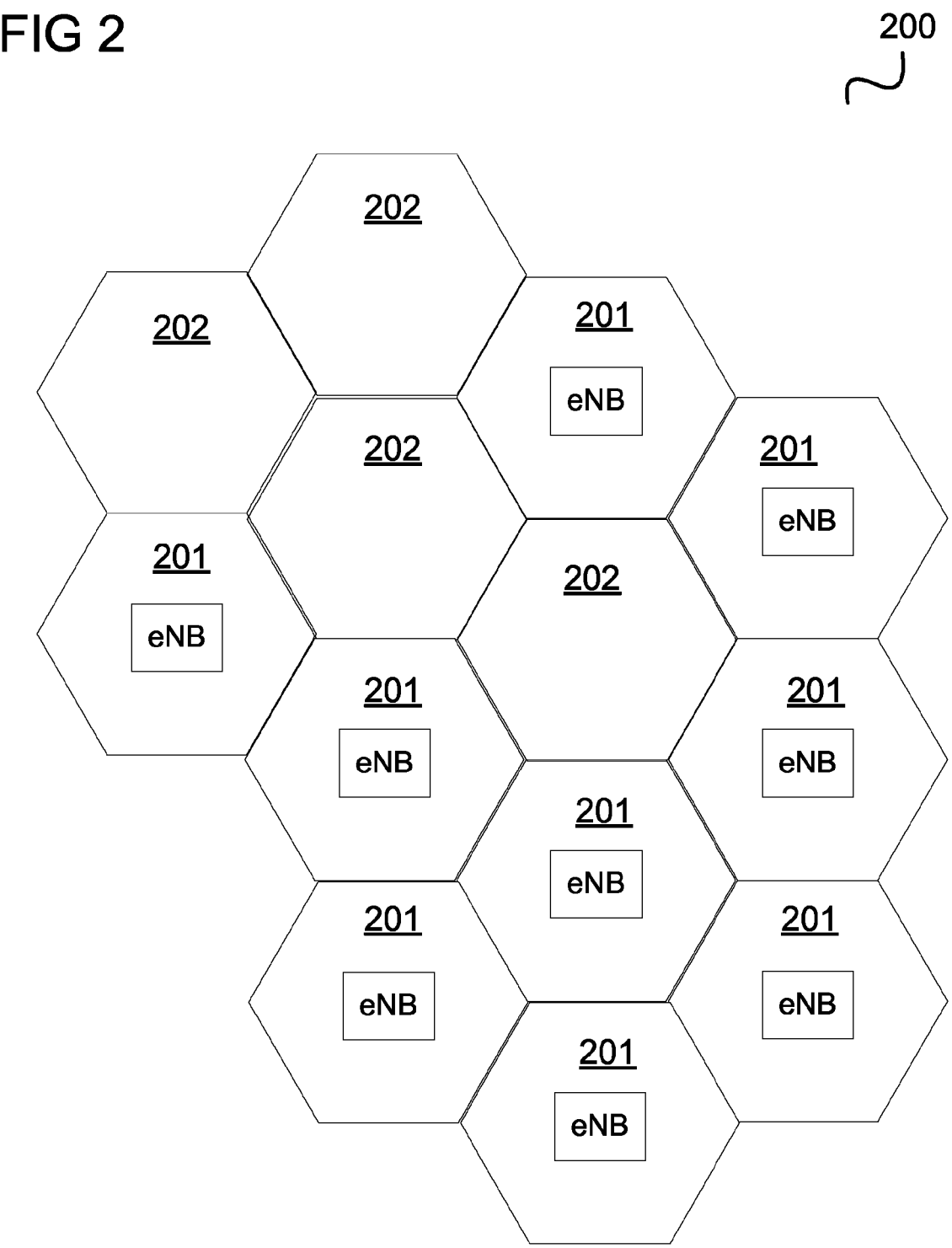
FIG. 2 shows a cell arrangement according to an embodiment.

This is illustrated in FIG. 2.

FIG. 2 shows a cell arrangement 200 according to an embodiment.

In the cell arrangement 200 there are radio cells 201 which are operated by a cellular mobile communication system (as indicated by the blocks labeled "eNB" for denoting base stations, in this example LTE base stations). For example, the radio cells 102 correspond to the radio cells 104 of the communication system 100 described with reference to FIG. 1.

In addition to the radio cells 201, there are geographical regions 202 (also illustrated in the hexagonal form of radio cells) in which the communication resources allocated to the cellular mobile communication system, e.g. licensed by the operator of the cellular mobile communication system, are not used.

The geographical regions 202 may be regarded as cellular white spaces, i.e. white spaces of the cellular mobile communication system. The geographical regions 202 may correspond to a limited geographical area and may be, as illustrated, located close to the neighboring radio cells 201, which are mobile network macro cells, for example.

In one embodiment, a communication device, for example corresponding to the communication device 111, located in one of the geographical regions 202 determines frequency resources allocated to the cellular mobile communication system but not being used in the geographical area 201. The communication device is for example a cognitive radio (CR) device (e.g. a CR user device) which can detect whether a certain frequency resource is being used, e.g. by components (such as network components or mobile terminals) of the cellular mobile communication system.

In one embodiment, interference is avoided such that the cognitive radio (CR) device operating in the geographical region (i.e. the cellular band white space) does not interfere with the neighboring base stations (e.g. eNBs), i.e. the base stations operating the radio cells 201 neighbouring or in the vicinity of the geographical region 201 in which the cognitive radio device is located. For example, the maximum output power of the cognitive radio device may depend on the total number of cognitive radio devices present in a certain neighborhood, since there may be an accumulation of interference towards the neighboring base stations. In one embodiment, the corresponding mechanisms for determining whether a cognitive radio device may be used in a given geographical region 202 and for determining the maximum output power for the cognitive radio device (potentially among neighboring other cognitive radio devices, leading to an accumulation of interference towards neighboring base stations) can for example be handled by the cellular communication network or by cognitive radio device centric decision making, i.e. by the cognitive radio device itself.

A communication device, for example corresponding to the communication device 111 shown in FIG. 1 and for example being located in a geographical region 202 as illustrated in FIG. 2, according to one embodiment, is described in the following with reference to FIG. 3.

Figure 3:
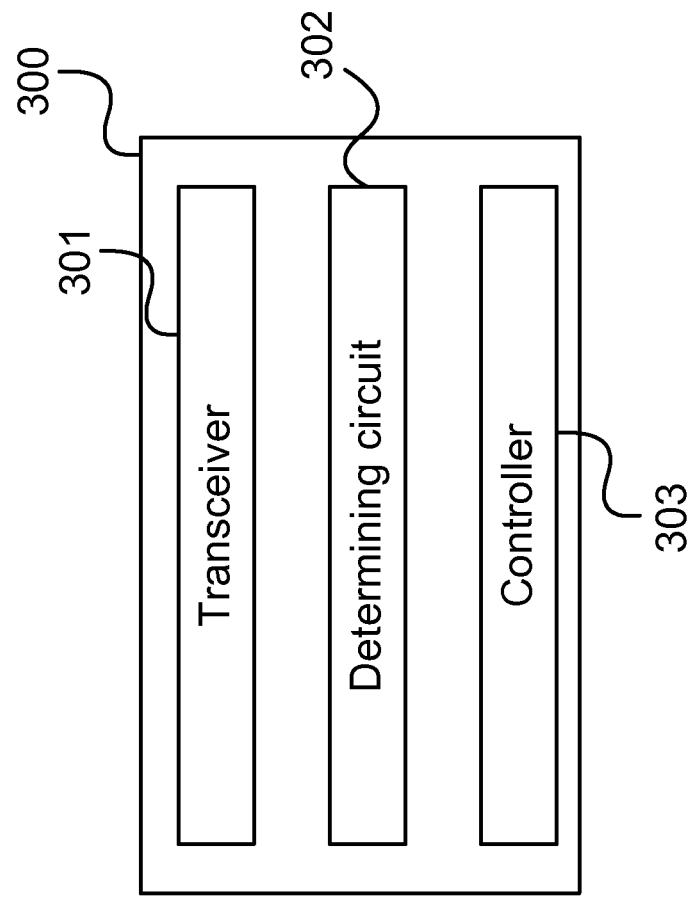
FIG. 3 shows a communication device according to an embodiment.

FIG. 3 shows a communication device 300 according to an embodiment.

The communication device 300 includes a transceiver 301, a determining circuit 302 configured to determine whether the communication device may use radio resources, which are allocated to be used by a wireless bidirectional communication system in the geographical region in which the communication device is located, for radio data communication without participation by the wireless bidirectional communication system, and a controller 303 configured to control the transceiver to carry out radio data communication using the radio resources if the communication device may use the radio resources.

In other words, illustratively, a communication device is provided that may be seen to operate as a cognitive radio device by detecting whether radio resources allocated to a wireless bidirectional communication network, i.e. for example licensed by an operator of the wireless bidirectional communication network can be used by the communication device without operating as a subscriber terminal of the wireless bidirectional communication network, since they are unused at the spot where the communication device is located. In other words, the communication device may detect whether it is located in a white space of the wireless bidirectional communication system (for example a cellular mobile communication system or cellular mobile communication network) and if it is, it may decide that it may use the radio resources for communication that is independent from the wireless bidirectional communication system, e.g. without registering in the wireless bidirectional communication system and requesting radio resource allocation from the wireless bidirectional communication system (i.e. without operating as a subscriber terminal of the wireless bidirectional communication system) but for example using a different communication system or even a different radio technology than, e.g. cellular mobile communication. The determining whether the communication device may use the radio resources may not only include the determination whether it is located in a white space of the wireless bidirectional communication system but also whether it would cause interference to the wireless bidirectional communication system, e.g. to a nearby base station of the wireless bidirectional communication system. For example, if there is no indication that interference to the wireless bidirectional communication system would be caused by using the radio resources, the communication device decides in the determination that it may use the radio resources.

The controller 303 may for example be configured to control the transceiver to carry out radio data communication using the radio resources while the communication device may use the radio resources. In other words, the determining circuit 302 may be configured to detect when the communication resources may no longer be used by the communication device and the transceiver may accordingly be controlled to stop using the radio resources for data communication. The communication device may thus be seen as a secondary user of the radio resources that stops usage of the radio resources when the primary user (i.e. the communication system to which the radio resources are allocated) returns, i.e. starts using the radio resources in the geographical region.

The geographical region may be a larger area but may also be smaller areas, e.g. shadwoed areas in which signals sent by the network side of the wireless bidirectional communication system (e.g. the radio access network in case of a cellular mobile communication system) cannot be received or can only be poorly received. For example, the geographical region can be a relatively small area behind a metal door or similar, e.g. a room or a part of a room or a closed room leading to bad propagation conditions (for both transmission to and from the network side of the wireless bidirectional communication system).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

For example, the wireless bidirectional communication system is a cellular mobile communication system. The wireless bidirectional communication system may generally be a communication system with, compared to for example a broadcast communication system such as a TV broadcast communication system or a radio broadcast communication system, relatively small radio cells. For example, the wireless bidirectional communication system may generally be a radio communication system relying on access points and base stations such as a 3GPP (Third Generation Partnership Project) communication system, a WiFi communication system, e.g. according to IEEE 802.11a/b/g/n, IEEE 802.11ac, or IEEE 802.11ad, a WiMAX communication system etc. A bidirectional system may be understood to be a communication system comprising a communication network and subscriber terminals and allowing communication in both the direction from the communication network to the subscriber terminals and in the direction from the subscriber terminals to the communication network, in contrast to, e.g., a broadcast communication network, e.g. a TV broadcast network, only allowing communication from the network side to the subscriber terminals.

In one embodiment, the controller is configured to control the transceiver to carry out the radio data communication without participation by the wireless bidirectional communication system.

The controller may for example be configured to control the transceiver to carry out the radio data communication using a different communication system than the wireless bidirectional communication system. E.g., the different communication system is an ad hoc communication system or another wireless bidirectional communication system.

The controller may also be configured to control the transceiver to carry out the radio data communication using a different radio technology than the radio technology used by the wireless bidirectional communication system. For example, the different radio technology is a peer-to-peer radio technology.

In one embodiment, the transceiver is configured to receive information based on which the communication device may determine whether the communication device may use the radio resources for data communication without participation by the wireless bidirectional communication system and the determining circuit is configured to determine whether the communication device may use the radio resources for radio data communication without participation by the wireless bidirectional communication system.

The transceiver may for example be configured to receive the information from another communication device.

For example, the transceiver is configured to receive the information from another communication device broadcasting the information.

The transceiver may be configured to send a request for the information to the other communication device and/or to a data base.

The transceiver may also be configured to receive, in addition to the information, information about how the radio resources may be used, e.g. at which maximum transmission power the radio resources may be used. In other words, in one embodiment, the transceiver may be configured to receive configuration information for the usage of the radio resources.

In one embodiment, the transceiver is configured to send a request for the information to another wireless bidirectional communication system, e.g. another cellular mobile communication system.

The other communication device is for example a mobile communication terminal.

In one embodiment, the information specifies whether another communication device detects usage of the radio resources by the wireless bidirectional communication system.

The communication device is for example a mobile communication terminal.

The communication device is for example configured to provide radio access to a communication network for at least one mobile communication terminal.

In one embodiment, the radio resources include one or more radio frequencies, one or more radio frequency regions or one or more radio frequency bands.

In one embodiment, the wireless bidirectional communication system is a communication system including base station controlled handover.

The radio resources for example include one or more IMT (International Mobile Telecommunications)-Advanced frequency bands, e.g. one or more of the frequency bands between 400 MHz to 5 GHz given above.

The wireless bidirectional communication system is for example a WRAN (Wireless Regional Access Network) or a WWAN (Wide Wireless Area Network).

The wireless bidirectional communication system for example corresponds to the cellular mobile communication system 100 described above with reference to FIG. 1.

The radio data communication carried out by the communication device 300 using the radio resources may be based on various communication network types and various communication technologies. For example, the communication device 300 may establish an ad-hoc communication network with another communication device and communicate with it according to the ad-hoc communication network, e.g. according to Bluetooth, the communication device 300 may communicate using a peer-to-peer link to another communication device or itself or another communication device, e.g. a cluster head communication device, may serve as base station in accordance with a cellular radio network communication technology etc.

Figure 4:
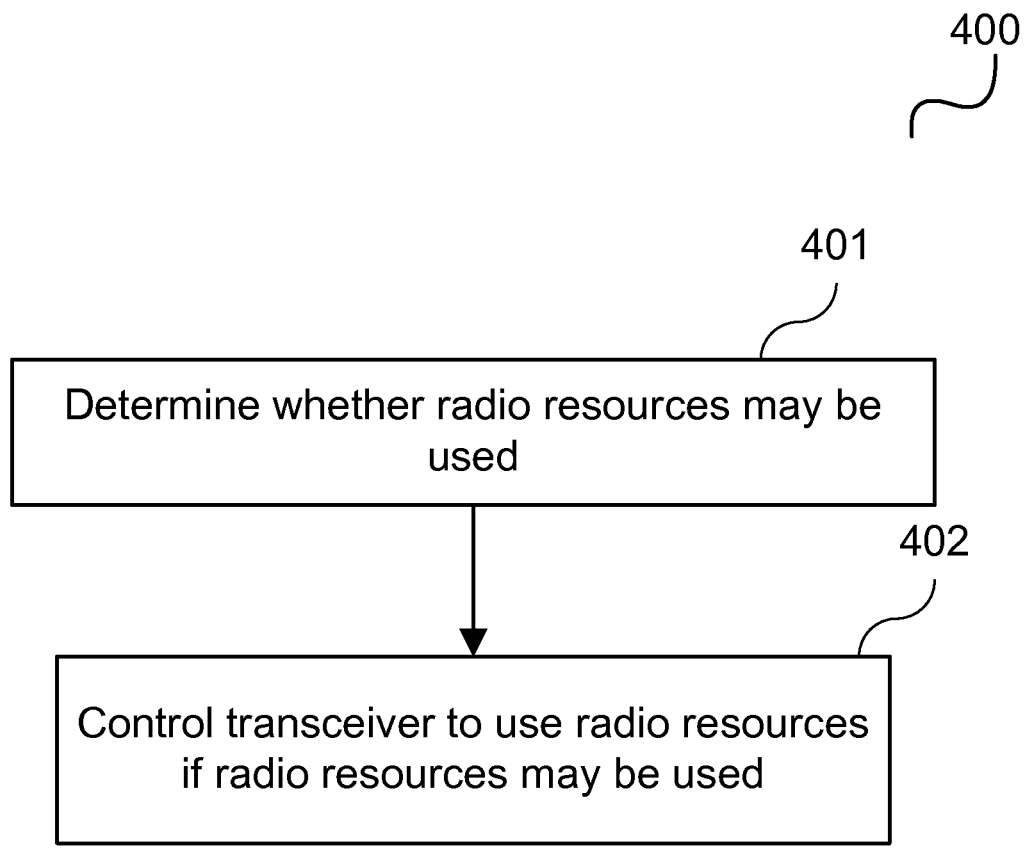
FIG. 4 shows a flow diagram according to an embodiment.

The communication device 300 for example carries out a method as illustrated in FIG. 4.

FIG. 4 shows a flow diagram 400 according to an embodiment.

The flow diagram 400 illustrates a method for data communication.

In 401, a communication device determines whether the communication device may use radio resources, which are allocated to be used by a cellular mobile communication system in the geographical region in which the communication device is located, for radio data communication without participation by the cellular mobile communication system.

In 402, the transceiver is controlled to carry out radio data communication using the radio resources if the communication device may use the radio resources.

The method is for example (only) used by the communication device if the communication device (e.g. a mobile device and/or a user terminal has no access to the wireless bidirectional communication system itself, e.g. due to shadowing, high distance to base stations, bad wave propagation characteristics, interference, etc.

In one embodiment the method is for example (only) used by the communication device when located within a closed facility (e.g. a building, etc.) where the radio signals are greatly attenuated by walls and other obstacles.

In one embodiment the method is for example (only) used by the communication device when located in a rural area which is poorly covered by macro base stations and/or cellular systems in general.

According to one embodiment, a computer program product is provided which includes instructions, which, when executed by a processor, make the processor perform the method explained above with reference to FIG. 4.

It should be noted that embodiments explained in context of the communication device are analogously valid for the other communication devices, the method for data communication and for the computer program product.

In the following, embodiments are described in greater detail for example including the processes carried out by the communication device 300 to obtain permission and corresponding parameters for operating in cellular white spaces, i.e. in a geographical region where radio resources allocated to the cellular mobile communication system are not used by the cellular mobile communication system.

Different embodiments may be used for the case that the communication device 300 is close to a neighboring base station of the cellular communication network (i.e. the cellular mobile communication system) and for the case that the communication device is at a certain distance to the nearest base station of the cellular communication network.

In the following, an embodiment is described in which it is assumed that the communication device 300 is for example relatively close to a base station of the cellular mobile communication system and in that the communication device 300 uses another communication network, e.g. a cellular communication network operated by a competitor of the operator of the cellular mobile communication system for determining whether it may use the radio resources allocated to the cellular mobile communication system.

Figure 5:
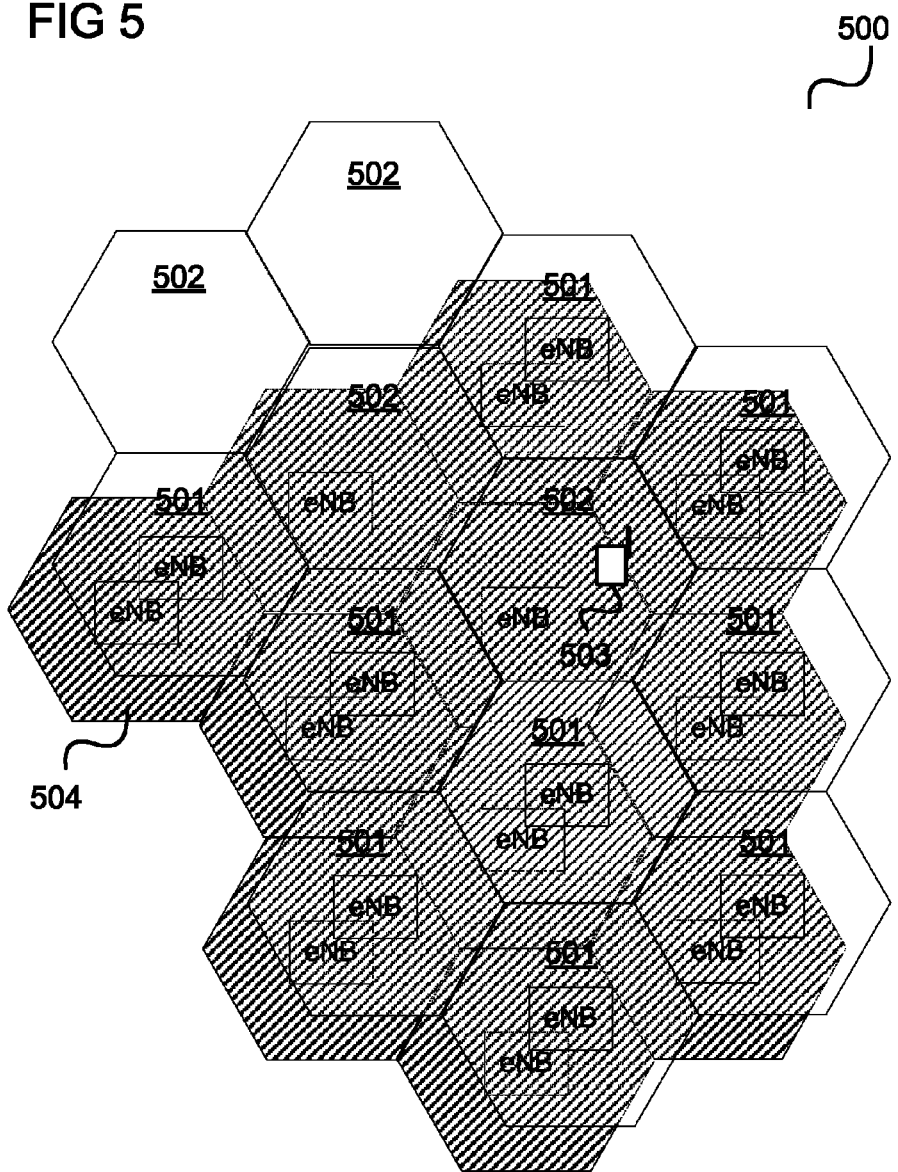
FIG. 5 shows a cell arrangement according to an embodiment.

The underlying scenario is illustrated in FIG. 5.

FIG. 5 shows a cell arrangement according to an embodiment.

Similarly as in the scenario illustrated in FIG. 2, the cell arrangement includes a plurality of radio cells 501 operated by the base stations of a cellular mobile communication system, e.g. corresponding to the communication system 100 described with reference to FIG. 1 and there are geographical regions 502 which are not covered by the cellular mobile communication system.

It is assumed that a communication device 503 corresponding to the communication device 300 shown in FIG. 3 is located in one of the geographical regions 502 in which the radio resources allocated to the cellular mobile communication system are not used by the cellular mobile communication system, which is also referred to as the cellular mobile communication system of operator A in this embodiment, due to lack of coverage, i.e. is located in a white space of the cellular mobile communication system of operator A.

In this case, it is assumed that the communication device 503 is close to radio cells 501 operated by base stations of the cellular mobile communication system.

It is further assumed that base stations of another cellular mobile communication system, which is also referred to as the cellular mobile communication system of operator B in this embodiment, operates radio cells 504 which may at least partially overlap with the radio cells 501 and which cover the geographical region 502 in which the communication device 503 is located. The cellular mobile communication system of operator B is assumed to use different radio resources, e.g. different frequency bands, from the radio resources allocated to the cellular mobile communication system of operator B.

Figure 6:
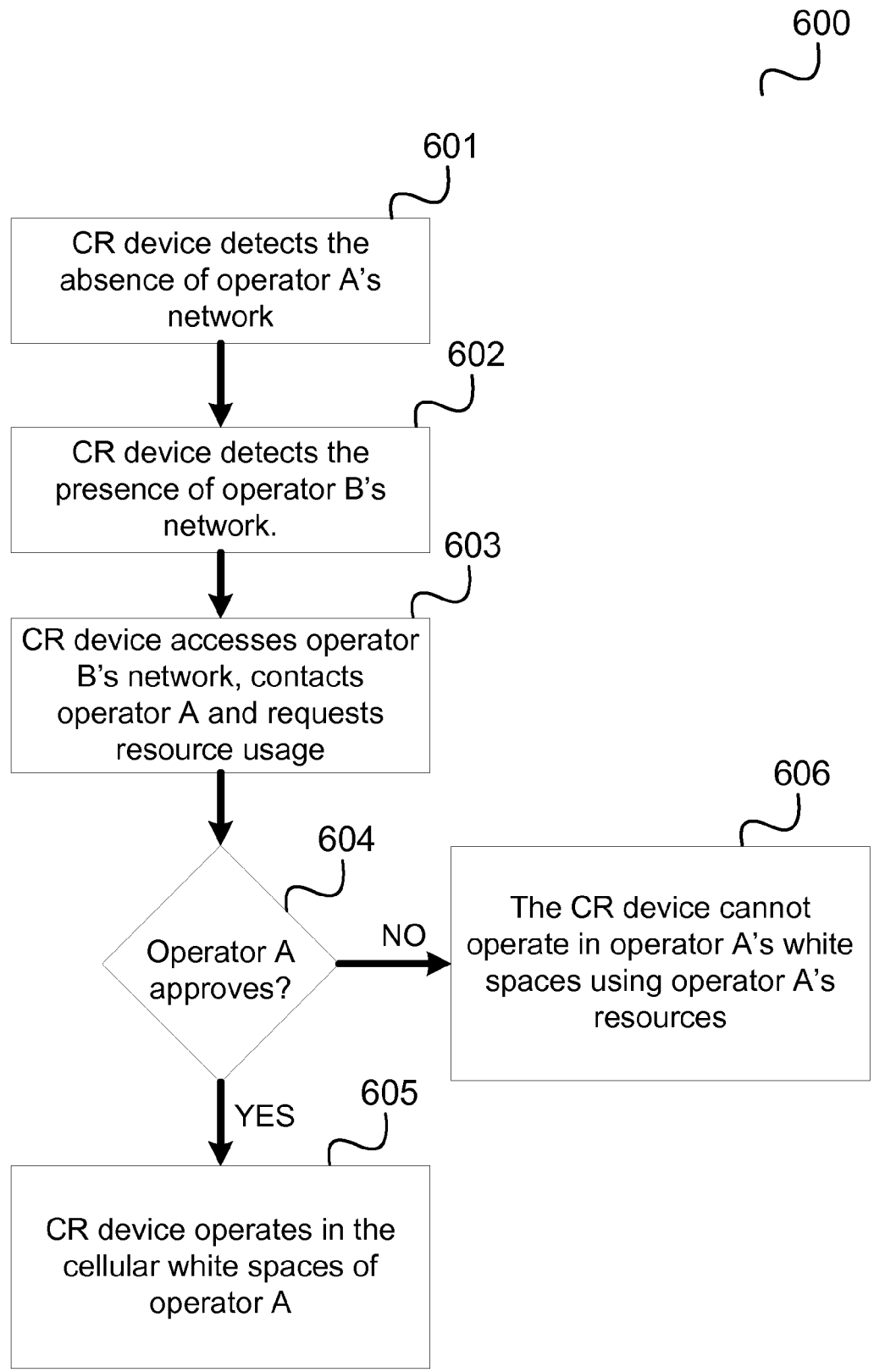
FIG. 6 shows a flow diagram according to an embodiment.

For example, the communication device 503 proceeds according to the flow illustrated in FIG. 6.

FIG. 6 shows a flow diagram 600 according to an embodiment.

In 601, the communication device 503 (referred to as cognitive radio, CR, device in FIG. 6, e.g. a CR user device) detects the absence of the coverage of the cellular mobile communication system of operator A e.g. by sensing or scanning.

In 602, the communication device 503 detects the presence of the coverage by the cellular mobile communication system of operator B.

In 603, the communication device 503 accesses cellular mobile communication system of operator B, contacts a component of the cellular mobile communication system of operator A via the cellular mobile communication system of operator B, indicates parameters such as location information, etc. to the cellular mobile communication system of operator A and requests the usage of radio resources allocated to the cellular mobile communication system of operator A, e.g. requests being allowed to operate in a cognitive radio mode, i.e. as a cognitive radio device, using the radio resources allocated to the cellular mobile communication system of operator A.

If, in 604, operator A approves the usage of the radio resources by the communication device 503, the communication device 503 operates in 605 in the cellular white spaces of the cellular mobile communication system of operator A, e.g. according to parameters indicated by the cellular mobile communication system of operator A (such as maximum output power, which is for example calculated by the cellular mobile communication system of operator A by taking other cognitive radio devices into account).

If, in 604, operator A does not approve the usage of the radio resources by the communication device 503, the communication device 503, in 606, cannot operate in the white spaces of the cellular mobile communication system of operator A. Alternatively, it may continue communicating using the cellular mobile communication system of operator B.

In one embodiment, the operator A and/or the operator B may delegate decision power and/or provisioning of information such as context information about the available spectrum to a trusted third party.

In another embodiment, also assuming the scenario illustrated in FIG. 5, the usage of the radio resources allocated to the cellular mobile communication system of operator A is controlled using a data base and using the cellular mobile communication system of operator B or any other available radio access technology.

In this embodiment, the presence of white spaces of the cellular mobile communication system of operator A and the required parameterization of cognitive radio devices that want to use the radio resources allocated to the cellular mobile communication system of operator A is centrally stored in a data base. For example, this data base is maintained by operators A or operator B. The data base is adequately designed for the relatively small cell sizes (compared to, for example, TV broadcast regions) and dynamically adapts stored cognitive radio device parameterization (or i.e. configuration) requirements (such as maximum output power, etc.) for the cognitive radio devices, for example taking the current number of cognitive radio devices and their current parameterization (i.e. their current configuration with regard to the usage of the radio resources allocated to the cellular mobile communication system of operator A) into account.

Figure 7:
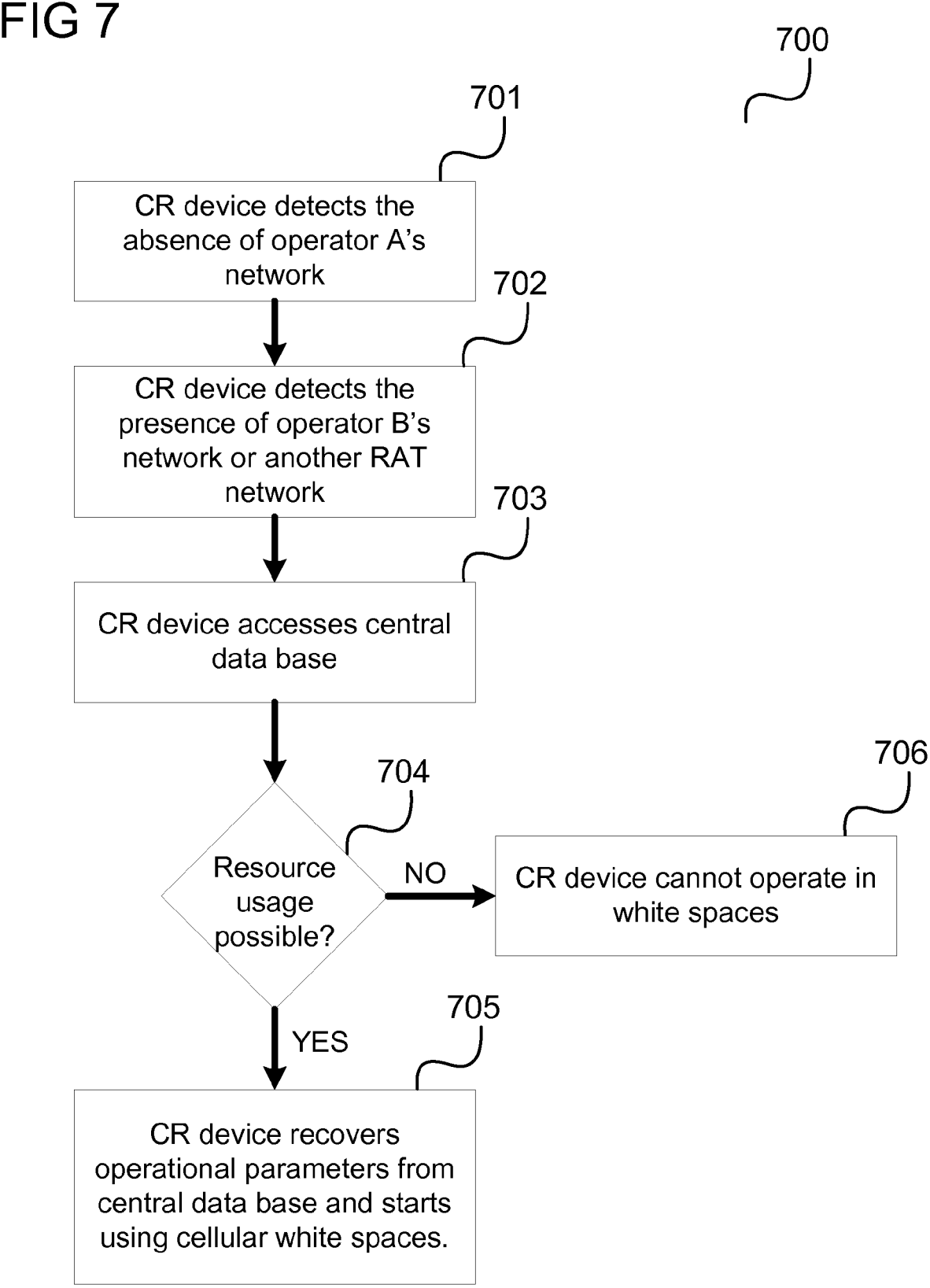
FIG. 7 shows a flow diagram according to an embodiment.

In this embodiment, the communication device 503 proceeds according to the flow illustrated in FIG. 7, for example.

FIG. 7 shows a flow diagram 700 according to an embodiment.

In 701, the communication device 503 detects the absence of the coverage of the cellular mobile communication system of operator A e.g. by sensing or scanning.

In 702, the communication device 503 detects the presence of the coverage by the cellular mobile communication system of operator B. In a scenario where the cellular mobile communication system of operator B is not available, the communication device 503 may for example detect the presence of another radio access network such as a WiFi network etc.

In 703, the communication device 503 accesses, via the cellular mobile communication system of operator B or via the other radio access network, a central data base requesting information about whether the operation in the white spaces of the cellular mobile communication system of operator A.

If, in 704, the usage of the radio resources by the communication device 503 is possible (e.g. is allowed), the communication device 503, in 705, recovers operational parameters from the data base and operates in the cellular white spaces of the cellular mobile communication system of operator A, e.g. according to the parameters.

If, in 704, the usage of the radio resources by the communication device 503 is not possible (e.g. not allowed), the communication device 503, in 706, cannot operate in the white spaces of the cellular mobile communication system of operator A. As an alternative, it may for example continue communicating using the cellular mobile communication system of operator B.

In the following, an embodiment is described in which the operator of the cellular mobile communication system to which the communication resources are allocated for which the communication device 503 determines whether they may be used controls the operation of cognitive radio devices, i.e. controls the usage of the radio resources by communication devices that are not part of the cellular mobile communication system, by using multi-hop communication.

Figure 8:
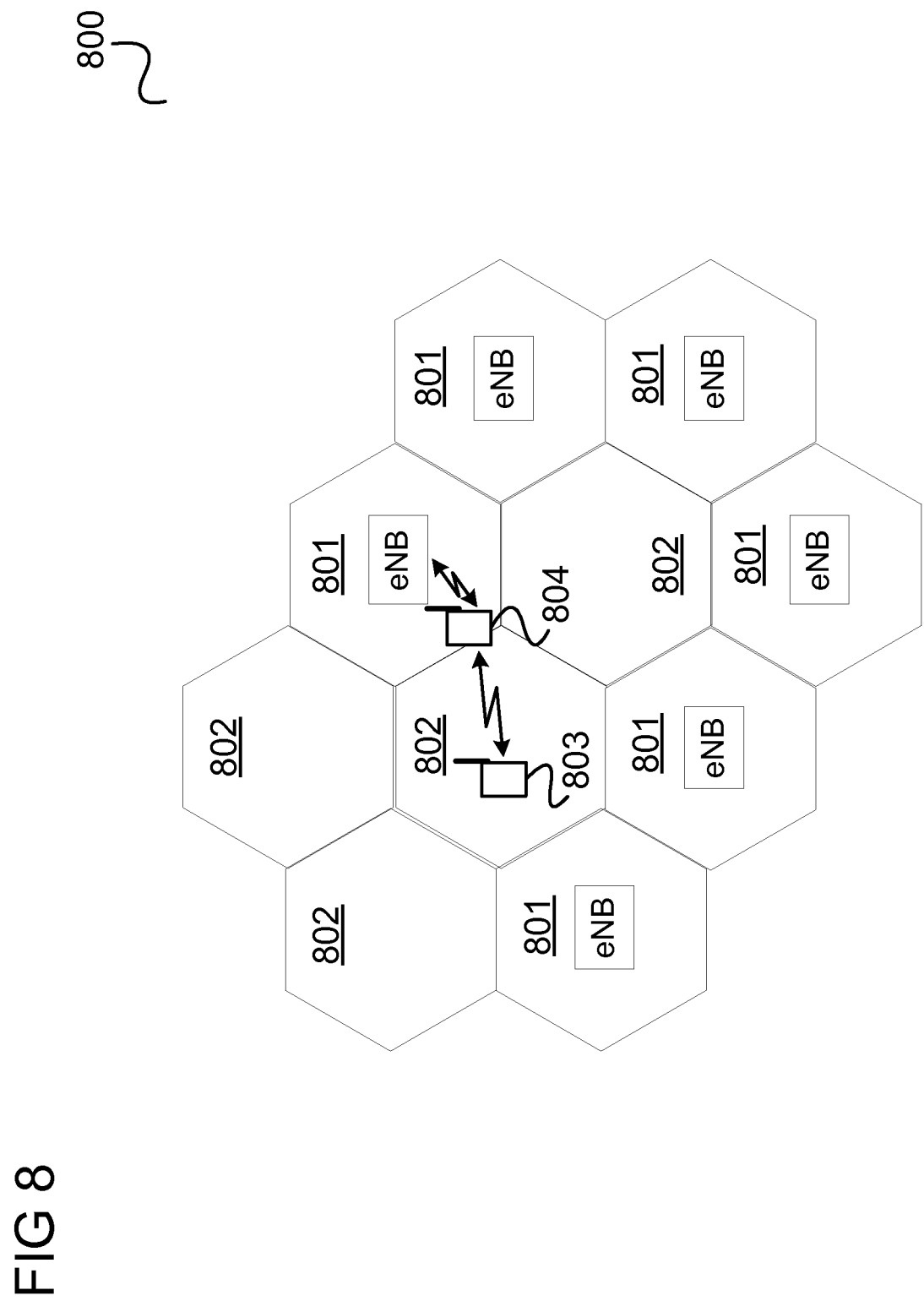
FIG. 8 shows a cell arrangement according to an embodiment.

The underlying scenario is illustrated in FIG. 8.

FIG. 8 shows a cell arrangement according to an embodiment.

Similarly as in the scenario illustrated in FIG. 2, the cell arrangement includes a plurality of radio cells 801 operated by the base stations of a cellular mobile communication system, e.g. corresponding to the communication system 100 described with reference to FIG. 1 and there are geographical regions 802 which are not covered by the cellular mobile communication system.

It is assumed that a communication device 803 corresponding to the communication device 300 shown in FIG. 3 is located in one of the geographical regions 802 in which the radio resources allocated to the cellular mobile communication system are not used by the cellular mobile communication system. As illustrated, the communication device 803 may be located in a geographical region (illustratively a white space of the cellular mobile communication system) that is located near the radio cells 801.

Similar to the approach described above with reference to FIG. 6, in which the communication device planning to use radio resources of the cellular mobile communication system of operator A in a white space connects to the cellular mobile communication system of operator A via access to the cellular mobile communication system of operator B, according to the approach of this embodiment, the communication device 803 is accessing cognitive radio parameterization information over a cellular mobile communication system network. However, in contrast to the embodiment described above with reference to FIG. 6, the communication device 803 accesses the cellular mobile communication system to which the radio resources for which it is determined whether they may be used itself are allocated. In this example, for this, a connection of the communication device 803, which is located outside the coverage area of the cellular mobile communication system itself, is provided by using a multi hop communication via another communication device 804 that is located in a radio cell 801. The corresponding multi-hop features can for example be expected to be available in next generation cellular systems, such as according to LTE-Advanced, IEEE 802.16, etc.

In the following, embodiments are described which may for example be used for a scenario in which the communication device 300 is at a considerable distance from the nearest base station of the cellular mobile communication system to which the radio resources are allocated which the communication device 300 uses if they are not used by the cellular mobile communication system itself. In one embodiment, the communication device 300 communicates with a cognitive radio cluster head for determining whether it may use radio resources allocated to the cellular mobile communication system.

Figure 9:
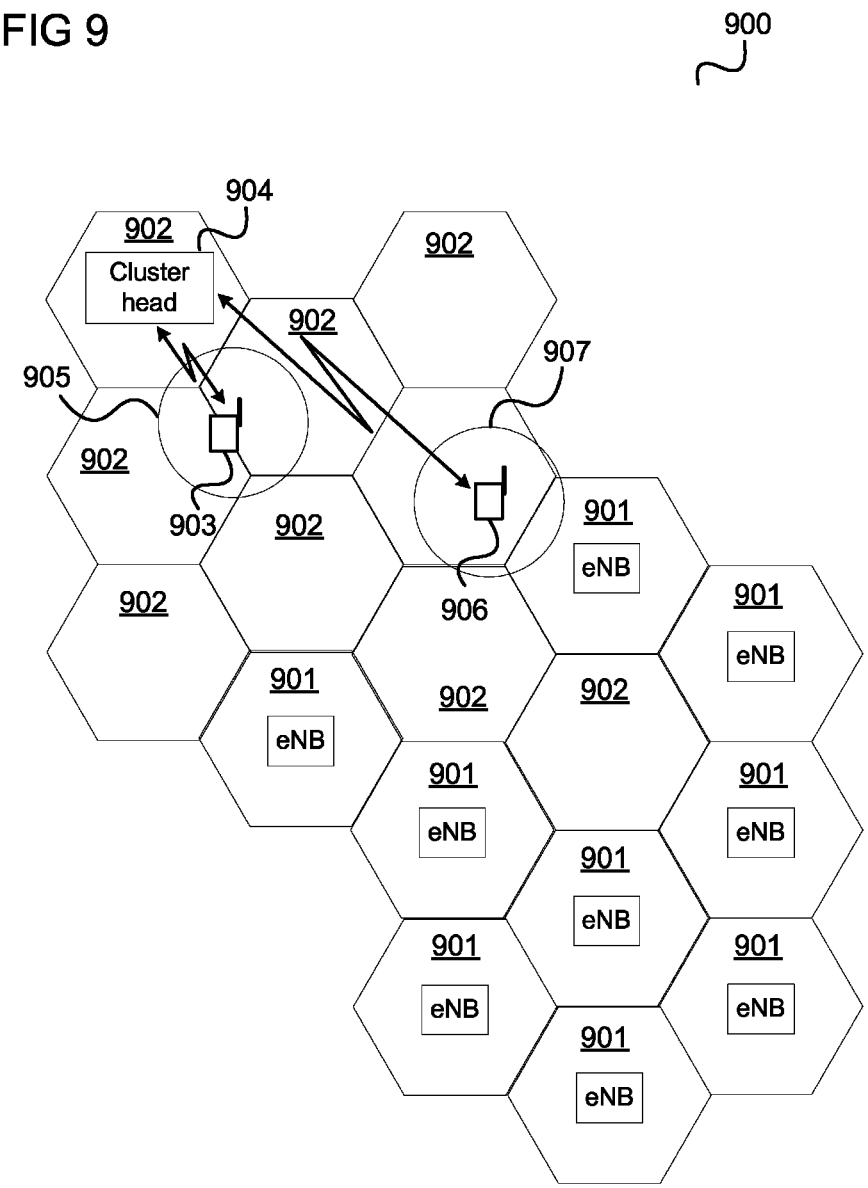
FIG. 9 shows a cell arrangement according to an embodiment.

The underlying scenario is illustrated in FIG. 9.

FIG. 9 shows a cell arrangement 900 according to an embodiment.

Similarly as in the scenario illustrated in FIG. 2, the cell arrangement includes a plurality of radio cells 901 operated by the base stations of a cellular mobile communication system, e.g. corresponding to the communication system 100 described with reference to FIG. 1 and there are geographical regions 902 which are not covered by the cellular mobile communication system.

It is assumed that a communication device 903 corresponding to the communication device 300 shown in FIG. 3 is located in one of the geographical regions 902 in which the radio resources allocated to the cellular mobile communication system are not used by the cellular mobile communication system, due to lack of coverage, i.e. is located in a white space of the cellular mobile communication system.

In this case, it is assumed that the communication device 903 is at a certain distance to the radio cells 901 operated by base stations of the cellular mobile communication system.

It is further assumed that there is another communication device 904, referred to as a (cognitive radio) cluster head located in a white space of the cellular mobile communication system, i.e. located in one of the geographical regions 902 not covered by the cellular mobile communication system. In this embodiment, the cluster head 904 broadcasts access information and condition information for the geographical regions 902 with regard to the radio resources allocated to the cellular mobile communication system.

A communication device that may be used as a cluster head 904 in one embodiment is described in the following with reference to FIG. 10.

Figure 10:
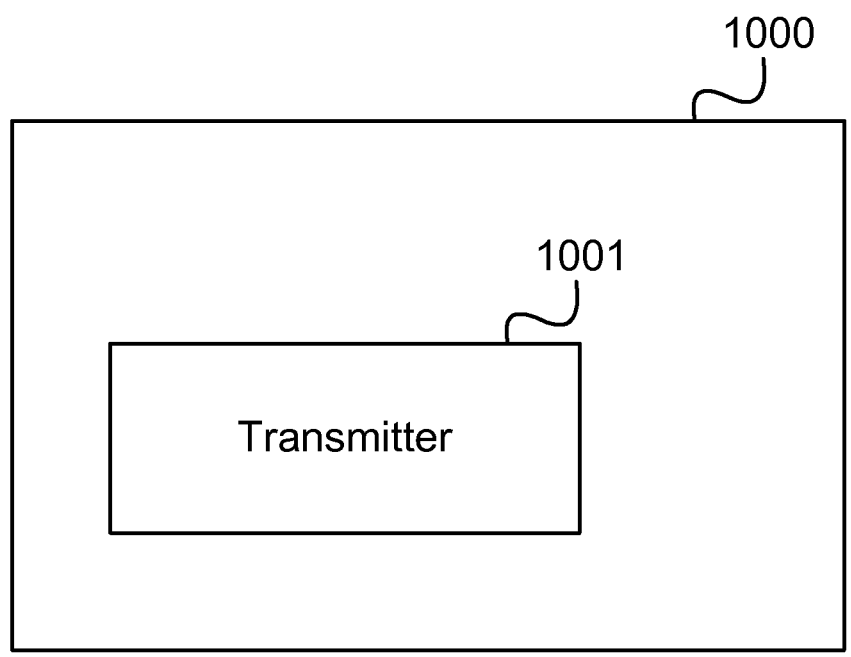
FIG. 10 shows a communication device according to an embodiment.

FIG. 10 shows a communication device 1000 according to an embodiment.

The communication device 1000 includes a transmitter 1001 configured to send information based on which another communication device may determine whether the other communication device may use radio resources, which are allocated to be used by a cellular mobile communication system in the geographical region in which the communication device is located, for radio data communication without participation by the cellular mobile communication system.

The communication device 1000 may for example be a communication device sending out a beacon including in the information. The communication device 1000 may for example be a (cognitive radio) cluster head.

In other words, illustratively, a communication device is provided signaling to one or more other communication devices (e.g. to the communication device 300 described with reference to FIG. 3) whether the other communication devices may use radio resources which are, basically, allocated to a cellular mobile communication system, without participation of the cellular mobile communication system e.g. without registering with the cellular mobile communication system, without requesting radio resource allocation from the cellular mobile communication system or even using a different communication network than the cellular mobile communication system or using a different radio technology than the cellular mobile communication system.

The transmitter is for example configured to broadcast the information.

The transmitter is for example configured to broadcast the information in a geographical region, in which communication devices may use the radio resources for data communication without participation by the cellular mobile communication system. For example, the operator of the cellular mobile communication system may put the communication device 1000 in a white space of the cellular mobile communication system for signaling to communication devices that the radio resources may be used.

The operator of the cellular mobile communication system may also locate the communication device 1000 in a geographical region where communication devices are not allowed to use the radio resources (without participation by the cellular mobile communication system). The communication device 1000 may be configured to send (e.g. broadcast) corresponding information to communication devices located in such a geographical region. The communication device may in the addition to the information also send information about the usage of the radio resources, e.g. the maximum transmission power with which the resources may be used, i.e. configuration information for the other communication device for the usage of the radio resources.

The communication device may further include a receiver configured to receive a request for the information from the other communication device.

In one embodiment, the controlling of the transceiver of one of the other communication devices (e.g. corresponding to the communication device 300 of FIG. 3) is carried out on a "push" basis, i.e. the communication device 1000 is cyclically broadcasting data (in form of a beacon or similar) indicating the white space usage conditions. This broadcast is in one embodiment not triggered by any action of the other communication device but occurs automatically.

In one embodiment, the controlling of the transceiver of one of the other communication devices (e.g. corresponding to the communication device 300 of FIG. 3) is carried out on a "pull" basis, i.e. the control unit is triggered by one or more other communication devices requesting the broadcast of data (in form of a beacon or similar) indicating the White Space usage conditions. This broadcast has in one embodiment to be triggered by a suitable action of one of the other communication devices (i.e. a request must be sent during a certain "request slot" for example that is for example indicated by communication device 1000).

In one embodiment, the communication by the communication device 1000 with the other communication device is based on a peer-to-peer link, i.e. communication both devices are exchanging data directly without passing through the bidirectional communication system or any other communication network.

In one embodiment, the communication of the communication devcie 1000 with the other communication device is based on an peer-to-peer information exchange in unlicensed bands (e.g. other than cellular white spaces), e.g. ISM bands, TV White Spaces, etc.

According to one embodiment, a method for signaling information according to the communication device 1000 is provided.

Figure 11:
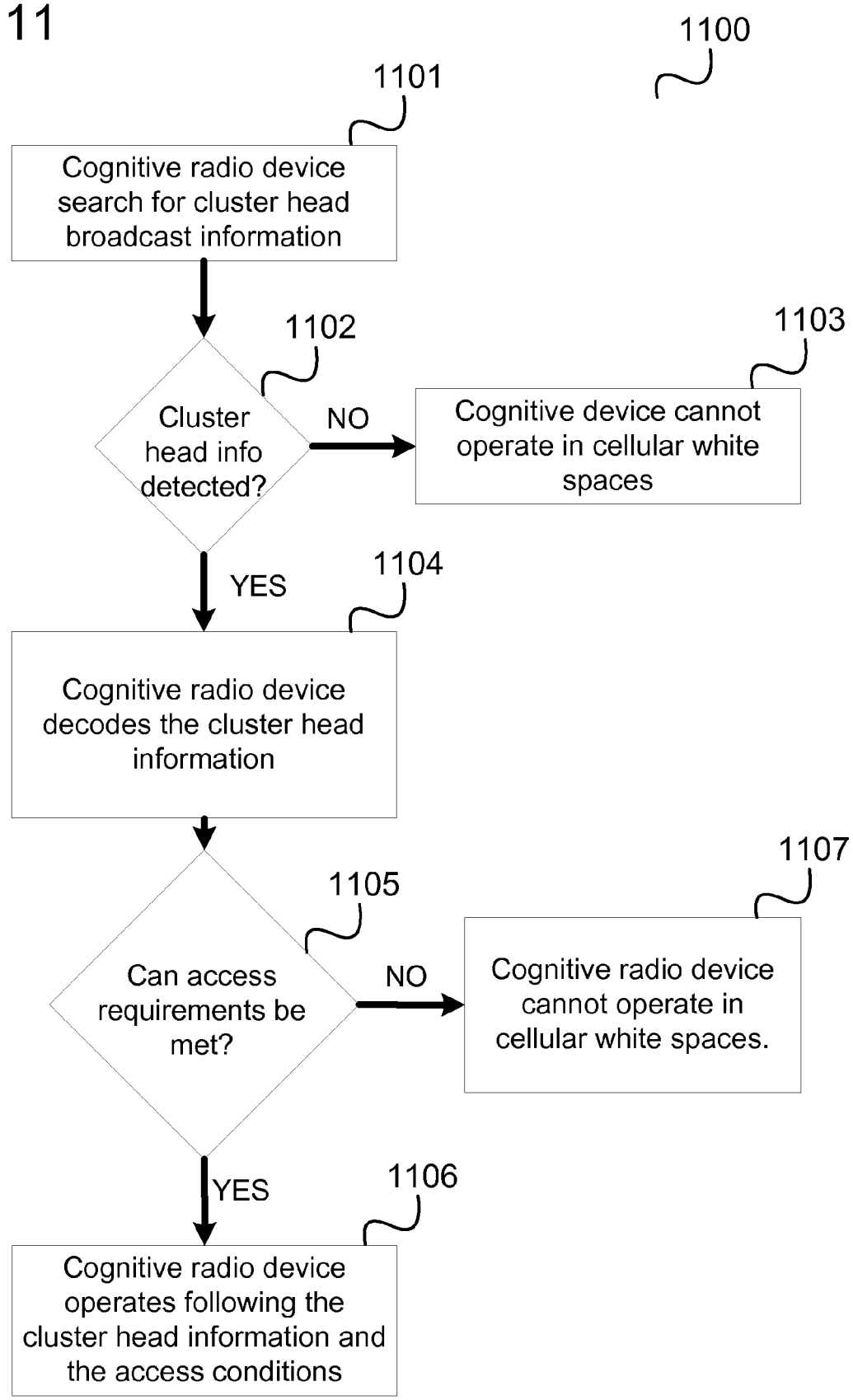
FIG. 11 shows a flow diagram according to an embodiment.

For example, the communication device 903 which wants to use radio resources proceeds according to the flow illustrated in FIG. 11.

FIG. 11 shows a flow diagram 1100 according to an embodiment.

In 1101, the communication device 903 searches for cluster head broadcast information, i.e. whether it can receive information transmitted (e.g. broadcast) by the cluster head 904, for example implemented by the communication device 1000 as described with reference to FIG. 10.

If, in 1102, cluster head information cannot be detected, the communication device 903, in 1103, cannot operate in the white spaces of the cellular mobile communication system using the radio resources allocated to the cellular mobile communication system.

If, in 1102, cluster head information can be detected, the communication device 903 decodes, in 1104, decodes the cluster head information and determines the conditions for the usage of the radio resources.

If, in 1105, the communication device 903 determines that it can meet the access requirements, i.e. can fulfill the conditions for usage of the radio resources, the communication device 903 uses, in 1106, the communication resources and operates in accordance with the cluster head information and the access conditions.

If, in 1105, the communication device 903 determines that it cannot meet the access requirements the communication device 903 cannot operate in the white spaces of the cellular mobile communication system using the radio resources allocated to the cellular mobile communication system in 1107.

The access conditions for the communication device 903 may include parameters such as
i) Location dependent access granting, i.e. the communication device 903 is only allowed to use a cellular white spaces when it is sufficiently far away from the closest base station of the cellular mobile communication system,
ii) (Location dependent) maximum output power levels, i.e. it must be ensured that the closest base stations of the cellular mobile communication system are not undergoing interference by the communication device 903, For example, the communication device 903 may be allowed to use the communication resources allocated to the cellular mobile communication system since its interference range 905 does not overlap with the radio cells 901 while another communication device 906 is not allowed to use the communication resources allocated to the cellular mobile communication system since its interference range 907 does overlap with one of the radio cells 901.

Further, before starting a communication, the communication device 903 may also be requested to register with the cluster head 904. This ensures that the cluster head 904 has knowledge about all cognitive (user) devices present in its neighborhood (e.g. in its coverage area). The cluster head 904 can thus derive the accumulated interference levels to neighboring base stations of the cellular mobile communication system and can adapt the access conditions (e.g. max. output power levels) correspondingly.

In another embodiment, the cluster head 904 is in contact with neighboring base stations and is negotiating access conditions and accumulated interference levels. Following these negotiations, correspondingly adapted access conditions are then be transmitted by the cluster head 904 to the communication device 903. An operator (e.g. of the cellular mobile communication system) can also change access conditions or if there are too many cognitive radio devices, the cluster head may constantly update the access conditions. Changed access conditions are then for example broadcast as updated access conditions by the cluster head 904.

In the following, an embodiment is described in which communication devices determine among themselves whether access to cellular white space, i.e. usage of radio resources allocated to a cellular mobile communication system, is possible.

Figure 12:
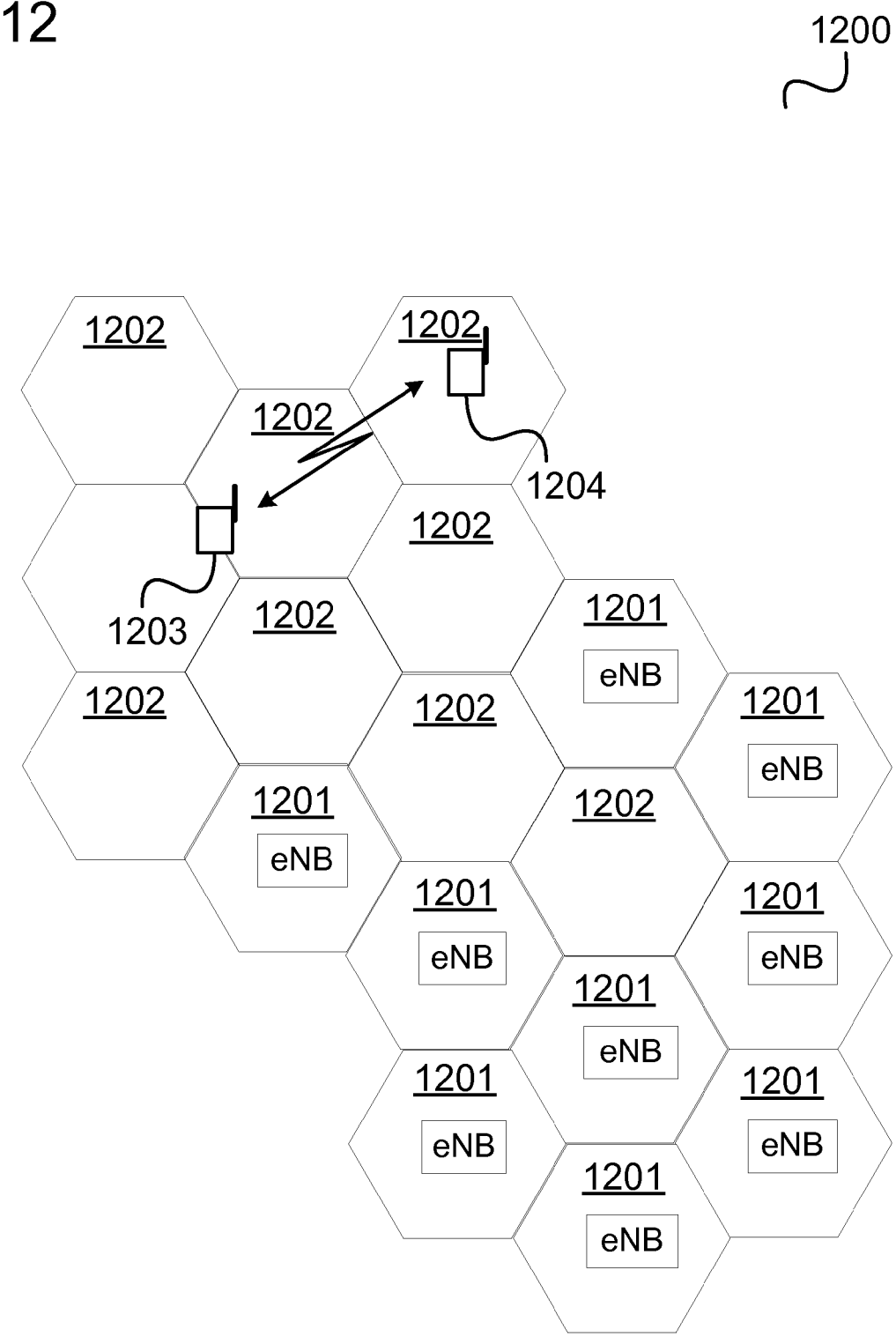
FIG. 12 shows a cell arrangement according to an embodiment.

The underlying scenario is shown in FIG. 12.

FIG. 12 shows a cell arrangement 1200 according to an embodiment.

Similarly as in the scenario illustrated in FIG. 9, the cell arrangement includes a plurality of radio cells 1201 operated by the base stations of a cellular mobile communication system, e.g. corresponding to the communication system 100 described with reference to FIG. 1 and there are geographical regions 1202 which are not covered by the cellular mobile communication system.

It is assumed that a first communication device 1203 (referred to as device A) and a second communication device 1204 (referred to as device B), both for example corresponding to the communication device 300 shown in FIG. 3, are each located in geographical regions 902 in which the radio resources allocated to the cellular mobile communication system are not used by the cellular mobile communication system, due to lack of coverage, i.e. are located in white spaces of the cellular mobile communication system.

In this embodiment it is assumed that the communication devices 1203, 1204 are located at a certain distance to the base stations of the cellular mobile communication system. For example, in the case that no cluster head is present as explained above with reference to FIGS. 9 and 10, the access decisions, i.e. the decision about the usage of the radio resources allocated to the cellular mobile communication system, are based on inter cognitive radio device communication.

For example, the communication devices 1203, 1204 communicate as follows for determining whether radio resources allocated to the cellular mobile communication system but not being used by the cellular mobile communication system in the geographical regions 1202 may be used by the communication devices 1203, 1204:
i) If available, the communication devices 1203, 1204 communicate on a dedicated frequency not interfering with any frequencies resources allocated to the cellular mobile communication network.
ii) If the communication devices 1203, 1204 have determined that they may use a radio resource allocated to the cellular mobile communication system but not being used by the cellular mobile communication system for further communication.

For example, the communication devices 1203, 1204 carry out the problem illustrated in FIG. 13.

FIG. 13 shows a flow diagram 1300 according to an embodiment.

In 1301, the first communication device 1203 plans to use peer-to-peer cognitive radio cellular white space communication, i.e. intends to use radio resources allocated to the cellular mobile communication system but not being used by the cellular mobile communication system for a peer-to-peer communication connection.

If, in 1302, the first communication device 1203 senses (i.e. detects) communication by the cellular mobile communication system e.g. by a neighboring base station of the cellular mobile communication system, the first communication device, cannot, in 1303, use the radio resources.

If, in 1302, the first communication device 1203 does not sense (i.e. does not detect) communication by the cellular mobile communication system, the first communication device 1203 sends a communication request in 1304, for example using one of the frequencies on which it has not detected any communication by the cellular mobile communication system to any neighboring devices.

In this example, it is assumed that the second communication device 1204, as a neighboring device to the first communication device 1203, is also interested in cognitive radio white space communication.

If, in 1305, the second communication device 1204 senses (i.e. detects) communication by the cellular mobile communication system e.g. by a neighboring base station of the cellular mobile communication system, the first communication device 1203 and the second communication device 1204, cannot, in 1306, use the radio resources.

If, in 1305, the second communication device 1204 does not sense (i.e. does not detect) communication by the cellular mobile communication system e.g. by a neighboring base station of the cellular mobile communication system, the communication devices 1203, 1204 exchange, in 1307, operational parameters (e.g. configuration parameters) and start using the communication resources, i.e. start operating on the cellular white space frequencies.

The embodiments described above can be seen to address the possibility to use cellular bands for opportunistic spectrum access if these cellular bands are unused at a given location, at a given time (i.e. can be seen as white spaces in cellular bands). This can be seen as a different approach from the usage of TV white spaces (typically 470-790 MHz) where TV broadcasters use the spectrum (and not cellular operators). For the usage of TV white space frequencies in the frequency range of 470-790 MHz (in Europe) or 54-698 MHz in the US the mobile terminal has typically to be aware of its location in order to request the usage of a specific fraction of the available TV bands. Embodiments may be seen to address the following issues:

Assume that at a given location, at a given time N cellular phone bands are available to operators. However, only K<N of these bands are actually used and the others can be accessed for opportunistic spectrum usage, e.g. for setting up an Ad-Hoc (home) network, etc. According to one embodiment, a mobile terminal (e.g. a UE) is enabled to know that cellular bands can be used for opportunistic spectrum usage and to request to be allowed to use of these cellular bands for opportunistic spectrum usage.

Assume that at a given location, at a given time N cellular phone bands are available to operators. However, none of these bands are actually used and they can be accessed for opportunistic spectrum usage, e.g. for setting up an Ad-Hoc (home) network, etc. According to one embodiment, a mobile terminal is enabled to know that cellular bands can be used for opportunistic spectrum usage and to request the usage.

The embodiments described above may be seen to cover two cases: The mobile terminal detects an unused portion of the cellular bands and i) it detects other operators being present in other parts of the cellular bands or ii) it does not detect other communication systems (typically due to shadowing effects, e.g. in the cellar of a building, etc.). Features of embodiments addressing these scenarios are summarized in the following.

The mobile terminal detects other operators (operator 'B') in other parts of the cellular bands:
According to one embodiment, the access right determination to white spaces is transferred from the mobile terminal to a more reliable (trusted) third party. For example, operator B (not the mobile terminal itself) performs the data base consultation, including the determination of the (approximate) position of the mobile terminal (e.g. by detection of the base station the mobile terminal is connected to, by triangulation, etc.); i.e., the mobile terminal is only sending a request to operator B whether it can use a specific band and does not provide any location (or other) information. Then, the mobile terminal gets an access grant (ok) or an access denial (not ok) from operator B including an indication which bands can be used (i.e. accessed) for which duration. This approach may eliminate a source of potential system failure, since the operator B based location determination is expected to be far more reliable, error-proof and hacker-proof compared to a mobile terminal based location determination (via GPS, etc.)

The mobile terminal does not detect the presence of any system at current location:
In this case, several approach may be used:
In case the mobile terminal detects neighbouring mobile terminal which can detect an operator's base station (which can be seen as a typical shadowing scenario for the mobile terminal), the mobile terminal acquires information through peer-to-peer communication and the mobile terminal requests the usage of white spaces through indirect communication via the neighbouring mobile terminal with the base station. The mobile terminal receives an access grant or an access denial again through the neighbouring mobile terminal. The neighbouring mobile terminal has the functionality to relay the white space usage request to the base station.

In case that the cellular mobile communication system is using the targeted band (i.e. the band that the mobile terminal wants to use) but neither the mobile terminal nor neighbouring mobile terminals can detect any base station (e.g. due to shadowing effects), the operator (of the cellular mobile communication system) may deploy a local white space cluster head which can be accessed by mobile terminals in order to request usage of white spaces. The introduction of such a box can help to prevent that mobile terminals in a shadowed area are creating interference in a given location. For example, the operator deploys such a box when the operator observes the regular occurrence of interference by mobile terminals accessing the cellular bands as opportunistic users.

In case that no cellular mobile communication system is using the targeted band; i.e., neither the mobile terminal, nor neighbouring mobile terminals can detect any base station, the mobile terminal may detect one or more neighbouring mobile terminals (via a peer-to-peer channel) which cannot detect any cellular mobile communication system themselves. Based on the information from the neighbouring mobile terminals (indicating that no base station is available nearby), the mobile terminal may decide for itself to use the cellular bands opportunistically (i.e. as white spaces) in order to build, for example, a local ad hoc (Home) Network, etc.

In summary, embodiments may for example have the following features:

Cellular white space communication in general ensuring protection of neighboring cells, Operator control of CR devices using competitor's network (see FIGS. 5, 6), Data base driven control of CR devices using competitor's network (or any other available radio access technology (see FIGS. 5, 7), Operator control of CR devices using multi-hop communication (see FIG. 8), CR devices are communicating with CR white space cluster head (see FIGS. 9 to 11), CR devices are determining themselves whether access to cellular white spaces is possible (see FIG. 12).

For example, an embodiment is applied in the case of two CR devices being located in a cellular white Space of a first operator A, while access to a second operator B is still possible. As described above with reference to FIGS. 5 and 6, the CR device is performing the following for ensuring that CR cellular white space access is not causing interference to operator A's cellular radio communication network:

a. The CR device accesses operator B's communication network, b. The CR Device connects to operator A's communication network (via operator B's communication network) and requests whether white space usage is allowed at its current location, c. If white space usage is allowed, the CR device negotiates white space access parameters with operator A's communication network, d. The CR device starts communicating in the cellular white spaces in accordance with the white space access parameters.

What is claimed is:

1. A communication device comprising:
a transceiver;
a determining circuit configured to determine whether the communication device may use radio resources, which are allocated to be used by a wireless bidirectional communication system in the geographical region in which the communication device is located, for radio data communication without participation by the wireless bidirectional communication system;
a controller configured to control the transceiver to carry out radio data communication using the radio resources if the communication device may use the radio resources,
wherein the controller is configured to control the transceiver to carry out the radio data communication using a different radio technology than the radio technology used by the wireless bidirectional communication system, wherein the different radio technology is a peer-to-peer radio technology, and
wherein the transceiver is configured to receive information based on which the communication device may determine whether the communication device may use the radio resources for data communication without participation by the wireless bidirectional communication system, wherein the information specifies whether another communication device detects usage of the radio resources by the wireless bidirectional communication system.

2. The communication device according to claim 1, wherein the wireless bidirectional communication system is a cellular mobile communication system.

3. The communication device according to claim 1, wherein the controller is configured to control the transceiver to carry out the radio data communication without participation by the wireless bidirectional communication system.

4. The communication device according to claim 3, wherein the controller is configured to control the transceiver to carry out the radio data communication using a different communication system than the wireless bidirectional communication system.

5. The communication device according to claim 4, wherein the different communication system is an ad hoc communication system or another wireless bidirectional communication system.

6. The communication device according to claim 1, wherein the transceiver is configured to receive the information from another communication device.

7. The communication device according to claim 6, wherein the transceiver is configured to receive the information from another communication device broadcasting the information.

8. The communication device according to claim 6, wherein the transceiver is configured to send a request for the information to the other communication device.

9. The communication device according to claim 8, wherein the transceiver is configured to send the request for the information to a data base.

10. The communication device according to claim 8, wherein the transceiver is configured to send a request for the information to another wireless bidirectional communication system.

11. The communication device according to claim 1, wherein the communication device is a mobile communication terminal.

12. The communication device according to claim 1, wherein the communication device is configured to provide radio access to a communication network for at least one mobile communication terminal.

13. The communication device according to claim 1, wherein the radio resources comprise one or more radio frequencies, one or more radio frequency regions or one or more radio frequency bands.

14. The communication device according to claim 13, wherein the radio resources comprise at least one or more of the frequency bands 410-430 MHz, 450-470 MHz, 470-960 MHz, 1710-2025 MHz and 2110-2200 MHz, 2300-2400 MHz, 2500-2690 MHz, 2700-2900 MHz, 3400-4200 MHz, and 4400-4990 MHz.

15. The communication device according to claim 1, wherein the radio data communication is carried out without passing through the wireless bidirectional communication system.

16. A method for data communication comprising:
a communication device determining whether the communication device may use radio resources, which are allocated to be used by a wireless bidirectional communication system in the geographical region in which the communication device is located, for radio data communication without participation by the wireless bidirectional communication system;
controlling the transceiver to carry out radio data communication using the radio resources if the communication device may use the radio resources,
wherein controlling the transceiver to carry out the radio data communication is configured to use a different radio technology than the radio technology used by the wireless bidirectional communication system, wherein the different radio technology is a peer-to-peer radio technology;

receiving information based on which the communication device ma determine whether the communication device may use the radio resources for data communication without participation by the wireless bidirectional communication system, wherein the information specifies whether another communication device detects usage of the radio resources by the wireless bidirectional communication system.

17. A computer program product stored in a non-transitory computer readable medium, which, when executed by a processor, make the processor perform a method for data communication, the method comprising:

a communication device determining whether the communication device may use radio resources, which are allocated to be used by a wireless bidirectional communication system in the geographical region in which the communication device is located, for radio data communication without participation by the wireless bidirectional communication system;

controlling the transceiver to carry out radio data communication using the radio resources if the communication device may use the radio resources, wherein controlling the transceiver to carry out the radio data communication is configured to use a different radio technology than the radio technology used by the wireless bidirectional communication system, wherein the different radio technology is a peer-to-peer radio technology; and receiving information based on which the communication device may determine whether the communication device may use the radio resources for data communication without participation by the wireless bidirectional communication system, wherein the information specifies whether another communication device detects usage of the radio resources by the wireless bidirectional communication system.

18. A communication device comprising a transmitter configured to send information based on which another communication device may determine whether the other communication device may use radio resources, which are allocated to be used by a wireless bidirectional communication system in the geographical region in which the communication device is located, for radio data communication without participation by the wireless bidirectional communication system using a peer-to-peer radio technology, wherein the information specifies whether the communication device detects usage of the radio resources by the wireless bidirectional communication system.

19. The communication device according to claim 18, where the transmitter is configured to broadcast the information.

20. The communication device according to claim 19, wherein the transmitter is configured to broadcast the information in a geographical region, in which communication devices may use the radio resources for data communication without participation by the wireless bidirectional communication system.

21. The communication device according to claim 18, further comprising a receiver, configured to receive a request for the information from the other communication device.

22. A communication device comprising:

a transceiver;

a determining circuit configured to determine whether the communication device may use radio resources, which are allocated to be used by a WRAN in the geographical region in which the communication device is located, for radio data communication without participation by the wireless bidirectional communication system;

a controller configured to control the transceiver to carry out radio data communication using the radio resources if the communication device may use the radio resources, wherein the controller is configured to control the transceiver to carry out the radio data communication using a different radio technology than the radio technology used by the WRAN, and wherein the different radio technology is a peer-to-peer radio technology, and wherein the transceiver is configured to receive information based on which the communication device may determine whether the communication device may use the radio resources for data communication without participation by the WRAN, wherein the information specifies whether another communication device detects usage of the radio resources by the WRAN.

* * * * *

UNITED STATES PATENT AND TRADEMARK OFFICE
CERTIFICATE OF CORRECTION

| | | |
|---|---|---|
| PATENT NO. | : 8,654,721 B2 | Page 1 of 1 |
| APPLICATION NO. | : 12/849846 | |
| DATED | : February 18, 2014 | |
| INVENTOR(S) | : Markus Dominik Mueck | |

It is certified that error appears in the above-identified patent and that said Letters Patent is hereby corrected as shown below:

In the Claims

Col. 19, line 6 (Claim 16, line 19): Please replace "device ma" with --device may--; and Col. 19, line 15 (Claim 17, line 3): Please replace "make the processor" with --makes the processor--.

Signed and Sealed this
Seventh Day of July, 2015

Michelle K. Lee
*Director of the United States Patent and Trademark Office*